（12）United States Patent
Brogna et al.

(10) Patent No.: US 10,415,470 B2
(45) Date of Patent: Sep. 17, 2019

(54) AIR INLET DUCT FOR AN AIRCRAFT TURBINE ENGINE

(71) Applicant: SAFRAN AIRCRAFT ENGINES, Paris (FR)

(72) Inventors: Romeo Brogna, Moissy-Cramayel (FR); Romain Jean-Claude Ferrier, Brunoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 357 days.

(21) Appl. No.: 15/455,532

(22) Filed: Mar. 10, 2017

(65) Prior Publication Data

US 2017/0260903 A1    Sep. 14, 2017

(30) Foreign Application Priority Data

Mar. 14, 2016    (FR) ...................................... 16 52089

(51) Int. Cl.
*F02C 7/04*       (2006.01)
*F02C 7/057*      (2006.01)
(Continued)

(52) U.S. Cl.
CPC ................. *F02C 7/04* (2013.01); *F02C 3/04* (2013.01); *F02C 6/206* (2013.01); *F02C 7/057* (2013.01);
(Continued)

(58) Field of Classification Search
CPC .. F02C 7/04; F02C 7/045; F02C 7/047; F02C 7/057; F05D 2270/17
See application file for complete search history.

(56) References Cited

U.S. PATENT DOCUMENTS 4,608,819 A * 9/1986 Colman ................. F01D 17/02
                                                    361/690
5,447,283 A    9/1995 Tindell
(Continued)

FOREIGN PATENT DOCUMENTS

EP    2009263 A2    12/2008
FR    3023322 A1    1/2016

OTHER PUBLICATIONS

Rapport de Recherche Preliminaire, mailed Dec. 5, 2016, issued in corresponding French Application No. 1652089 filed Mar. 14, 2016, 7 pages.

*Primary Examiner* — Steven M Sutherland
(74) *Attorney, Agent, or Firm* — Christensen O'Connor Johnson Kindness PLLC

(57) ABSTRACT

Air inlet duct of a turbine engine, in particular an aircraft turbine engine comprising a gas generator, which extends axially between the air inlet and the gas generator and has a first axial wall part and a second wall part which is angularly offset with respect to the first part, which duct is capable of causing, in a shedding region, shedding of the boundary layer formed by an air flow along the wall of the duct; and a device for controlling said shedding of the boundary layer, characterised in that the control device comprises an air-blowing pipe which opens via at least one air-injection opening which is directly upstream of the shedding region, the blowing pipe being connected to an air intake positioned upstream of said air-injection opening or in the shedding region and comprising an air compressor means between the air intake and the air-injection opening.

9 Claims, 3 Drawing Sheets

(51) Int. Cl.
*F02C 3/04* (2006.01)
*F02C 6/20* (2006.01)
*F02K 3/072* (2006.01)

(52) U.S. Cl.
CPC ........ *F02K 3/072* (2013.01); *F05D 2220/325* (2013.01); *F05D 2270/17* (2013.01)

(56) References Cited

U.S. PATENT DOCUMENTS

| | | | |
|---|---|---|---|
| 2006/0032988 A1* | 2/2006 | Webster | F01D 5/145 |
| | | | 244/207 |
| 2008/0156187 A1 | 7/2008 | Tingle et al. | |
| 2013/0000305 A1* | 1/2013 | Smith | F02K 1/28 |
| | | | 60/697 |
| 2013/0266419 A1* | 10/2013 | Richardson | F01D 17/00 |
| | | | 415/1 |
| 2013/0280046 A1* | 10/2013 | Morel | F02C 6/08 |
| | | | 415/119 |
| 2016/0144949 A1* | 5/2016 | Kestler | B64D 33/02 |
| | | | 244/53 B |

* cited by examiner

AIR INLET DUCT FOR AN AIRCRAFT TURBINE ENGINE

BACKGROUND

The present invention relates to the field of fluid flows along a surface where there is significant diversion, and relates to air inlets of aircraft engines. The prior art includes in particular US Patent Application Publication No. 2008/156187 A1, EP Patent Application Publication No. 2009263 A2, FR Patent Application Publication No. 3023322 A1 and U.S. Pat. No. 5,447,283 A.

An air inlet duct of a turbine engine, in particular an aircraft turbine engine, is designed to guide air from the air inlet of the turbine engine to the gas generator. Some turbine engines, such as engines having unducted propellers, for example turboprop engines or engines of the type having a pair of contra-rotating propellers, can comprise an air inlet into the turbine engine having an axis different from that of the air inlet into the gas generator by which the propeller is driven. The axes thereof may be offset. This is generally the case for a turboprop engine where the axis of the propeller is itself offset with respect to that of the gas generator. This may also be the case at the front of an engine having a pair of contra-rotating propellers. FIG. 1 shows a turbine engine of this kind having two air inlets having axes which are offset with respect to that of the turbine engine. The air inlet shaft or duct therefore comprises a region in which the air flow is subject to significant diversion.

In this case, the air inlet duct comprises, between the air inlet and the gas generator, an intermediate cross-section having a relatively complex shape and, if applicable, a particle-removal channel forming a trap, which channel extends in the nacelle substantially along the axis of the air inlet and makes it possible to remove foreign bodies in order to prevent them from entering the gas generator.

When viewed from the side, the intermediate cross-section has the general shape of a gooseneck, the upstream end of which is connected to the air inlet in the nacelle and the downstream end of which is connected to the air inlet in the gas generator via a supply channel. The supply channel is positioned radially inwards with respect to the removal channel, and the intermediate cross-section comprises a part for connecting one channel to the other. There are other types of air inlet, each of these air inlets comprising a connecting part forming a diversion of the air flow.

The air inlet duct has the function of supplying the gas generator with air in the most homogenous manner possible. However, the above-mentioned complex shape of the pipe creates distortions in the air flow supplying the gas generator, which has a negative impact on the performance and operability of the turbine engine. This distortion is essentially due to the shedding of air streams caused by the significant diversion of the air flow in the above-mentioned intermediate cross-section.

One solution to this problem consists in incorporating vortex generators in the upstream end of the air inlet duct in order to energise the boundary layer and reduce the shedding. This could involve, for example, transposing passive devices which use vortex-generating means that are designed to control the shedding of air on the blades of turbine engines. FR 2 976 634, in the name of the present applicant, describes a device of this kind. Unfortunately it appears that, although this solution is practical, it would not be sufficiently effective in this type of design. Indeed, the duct opens very significantly in the diversion region and the disruptions required in order to limit the shedding of the boundary layer cannot be provided by a device of this type.

Another solution known from the prior art includes a system for actively controlling the shedding of the boundary layer in the air inlet ducts having significant diversions. For example, devices are known which suck air into the boundary layer of the flow circulating in the duct, which prevents the shedding of the flow, or which inject air at a very high speed in parallel with the wall so as to locally increase the amount of movement of the internal region of the boundary layer and to delay the shedding of the boundary layer and/or reduce the intensity thereof. Devices of this kind are complex and require elements for the circulation of air, by suction or blowing, to be installed in a compartment of the nacelle or close to the duct.

The aim of the present invention is to propose a system which makes it possible to reduce the flow shedding in the air inlet duct, in a targeted manner, and to thereby reduce the distortion in the region of the compressor while having as little impact as possible on operability and efficiency.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention proposes an air inlet duct of a turbine engine, in particular of an aircraft turbine engine comprising a gas generator, which extends axially between the air inlet and the gas generator and has a first axial part and a second part which is angularly offset with respect to the first part, which duct is capable of causing, in a shedding region, shedding of the boundary layer formed by an air flow along the wall of the duct; the invention also proposes a device for controlling said shedding of the boundary layer.

According to the invention, the duct is characterised in that the control device comprises an air-blowing pipe which opens, via at least one air-injection opening which is directly upstream of the shedding region, into the boundary layer formed along the wall of the duct, the blowing pipe being connected to an air intake positioned upstream of the air-injection opening or in the shedding region and comprising an air compressor means between the air intake and the air-injection opening.

According to another feature, the air-injection opening in the boundary layer is positioned directly upstream of said second offset part of the duct. The opening can have different shapes, generally one or more slots, and is positioned directly upstream of the part of the wall having a curvature which is inclined towards the axis of the gas generator.

According to one embodiment, the intake is either positioned on the first axial wall part of the duct where the boundary layer is bonded to the wall, or the wall forms a lip at the upstream aperture thereof accommodating a groove, the air intake being arranged in said groove.

According to a preferred embodiment, the air intake is positioned downstream of the injection opening, along the part of the wall, in the shedding region. The latter solution has the advantage of allowing the use of a compact device owing to the proximity of the air intake and the injection opening.

If the blowing system breaks down, it is advantageous to have a shut-off valve on at least one of the air intake and the injection opening. Preferably, the air intake and the injection opening are each provided with a valve, said valves being controlled by the same control system having, for example, the same motor for the two valves. This prevents non-controlled air flows from becoming established and disrupting the boundary layer in the injection region.

The present invention applies to all air inlets which are subject to significant diversion resulting in shedding of the boundary layer, such as in an engine having unducted propellers, such as a turboprop engine or an engine having a pair of contra-rotating propellers.

Therefore, the invention also relates to an aircraft turbine engine having unducted propellers, such as a turboprop engine or an engine having a pair of contra-rotating propellers, comprising an air inlet duct characterised thus. In particular, the invention relates to a turbine engine of which the air inlet comprises an axial part and an intermediate part, the intermediate part dividing the axial part into two duct portions, namely a portion which is angularly offset with respect to said axial part (connected, for example, to the duct which supplies the gas generator with air) and a part (capable of forming a particle trap) in the axial extension of said axial part.

The present invention thus proposes a simple, effective and economical solution.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
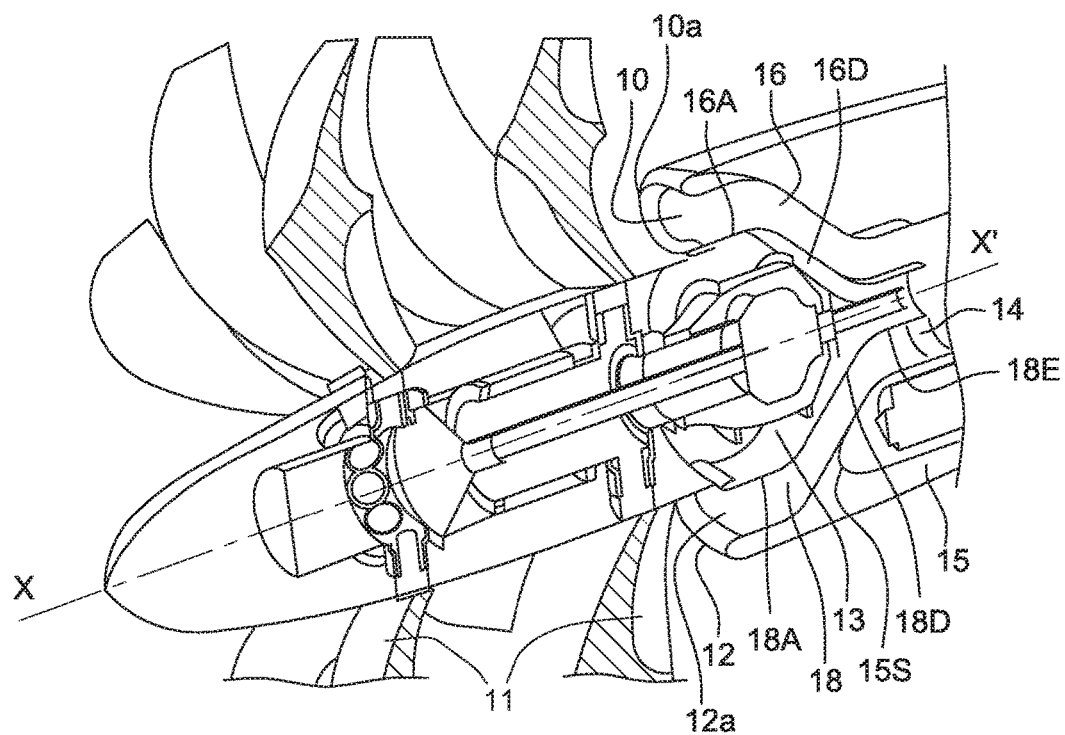
FIG. 1 is a perspective sectional view of an open rotor engine, showing the air inlet duct to which the invention relates.
Figure 2:
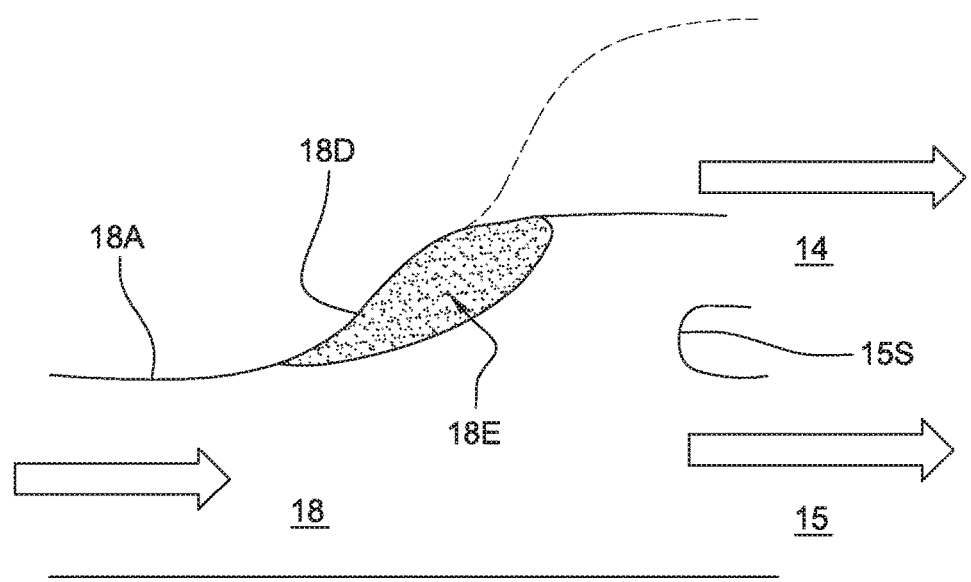
FIG. 2 is a diagram showing the phenomenon of shedding of the boundary layer when the significant diversion of the wall begins.

Reference is first of all made to FIG. 1, which shows the front of an example of an engine having a pair of unducted propellers, also known as "open rotor", when seen from a perspective front three-quarter axial view in cross section. The turbine engine comprises, at the front, two contra-rotating propellers 11 driven by an engine which is positioned in the downstream extension of the axis of the pair of propellers 11. Immediately downstream, two air inlets 10 and 12 on the nacelle supply the gas generator (not shown in this drawing) with air. The air inlets 10 and 12 are positioned on either side of the casing 13 (in this case, above and below) in which the drive mechanism and the control mechanism of the pair of propellers 11 is housed. The inlets 10 and 12 have a lip 10a and 12a forming a leading edge and communicating with two air inlet ducts 16 and 18 which have an oblong cross section here. These two ducts 16 and 18 converge to form a single annular channel 14 which is downstream of the casing 13 and forms the channel 14 for supplying the gas generator with air. Since the two inlets 10 and 12 are radially remote from the engine axis X-X', the two ducts or shafts 16 and 18 have a transition portion which is radially inclined so as to join the annular supply channel 14. With respect to the duct 18, the profile of the wall which is radially closest to the axis therefore has a first part 18A which is remote from the axis and a second part 18D which slopes towards the axis and is connected to the part 18E of the channel 14 which supplies the engine. The same applies to the air inlet duct 16. The duct 18 expands at the inlet of the second part 18D of the wall which is inclined towards the axis, owing to the presence of a trap for particles and foreign bodies. The air flow which flows along the air inlet duct 18 is subject, in this region, to significant diversion, the particles following an axial trajectory towards the trap channel 15 which forms a third part of the duct. The shedding dihedral 15S between the channel 15 forming the third part of the duct and the part of the duct leading into the channel 14 supplying the gas generator should be noted. The aerodynamic conditions are capable of causing shedding of the boundary layer along the internal wall when said layer passes from the first part 18A which is parallel to the engine axis to the second inclined part 18D. This region is referred to as the shedding region. The shedding disrupts the flow and creates distortions which impact the performance and operability of the gas generator downstream.

According to the invention, an active-control device is arranged for the boundary layer.

Figure 3:
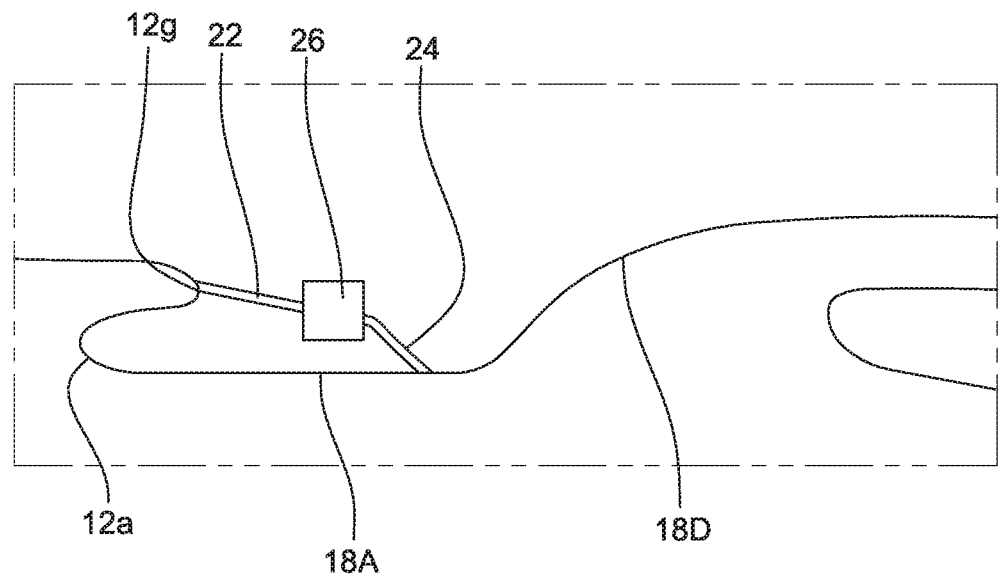
FIG. 3 is a diagram showing a first embodiment of the invention.

In FIG. 3, according to a first embodiment, when there is a groove 12g between the lip 12a of the air inlet duct 18 and the nacelle, it is possible to capitalise on the fact that the groove is a region for halting the flow and that the static pressure in this region is increased. Moreover, the static pressure is weaker downstream in the air duct owing to local reduced pressure brought about by the diversion of the wall. This difference in pressure is used in order to arrange an air intake 22 in the groove and to induce blowing 24 in the boundary layer, in particular in the region of the part of the wall between the axial part 18A and the offset part 18D having a curvature which is inclined towards the axis of the turbine engine. As mentioned above, the air which is injected in parallel at high speed makes it possible to increase the amount of movement of the internal region of the boundary layer so as to prevent shedding of the boundary layer. Valves (not shown) can be provided for controlling the air injection.

Another advantage of this solution is that, by creating local recirculation in the groove, the halting region located in the groove has an adverse effect on the nacelle drag and potentially on the amount of flow captured by the air inlet. The halting region and therefore the adverse effects associated therewith are reduced by extracting air from the groove.

Although the difference in pressure is significant, it is desirable to provide a compression means 26 between the air intake 22 and the blowing 24 in order to promote suction of the flow in the groove 12g.

Figure 4:
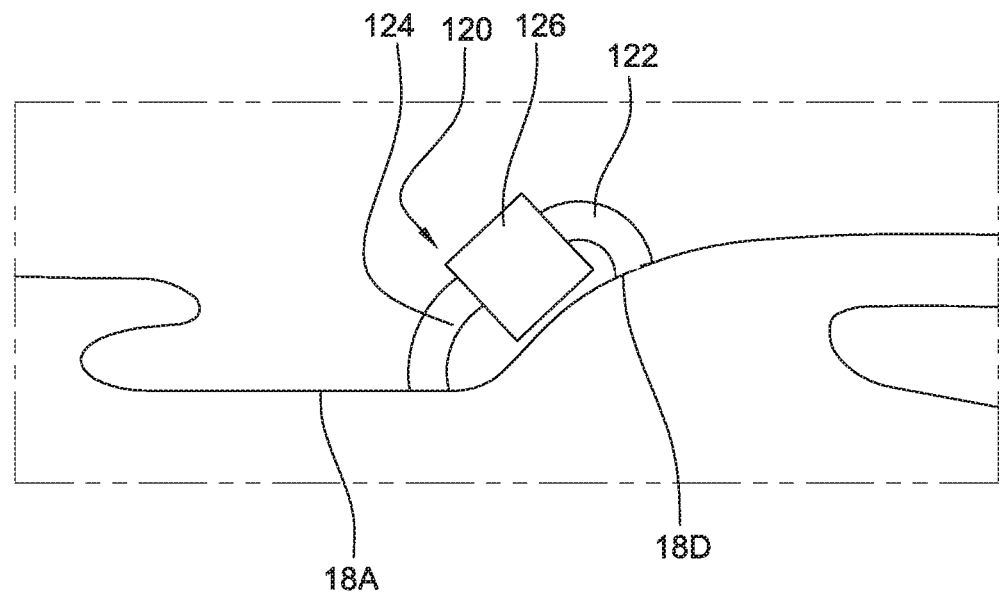
FIG. 4 is a diagram showing a second embodiment of the invention.

Another embodiment is described in relation to FIG. 4. This embodiment consists in withdrawing the flow from the shedding region where the boundary layer is shed, in order to inject said flow upstream of the region in which the boundary layer is separated. This makes it possible both to energise the boundary layer and to then reduce the extension of the shedding by making optimum use of the advantages provided by the suction and blowing of the flow close to the wall. In practice, the withdrawal 122 takes place in the offset part of the wall 18D and downstream of the part having a curvature. In this region, the air duct forms what is known as a plenum chamber. The air withdrawn in 122 is compressed by a compression means 126 and injected in 124 through one or more openings in the wall, which are preferably located in the region having the curvature, between the axial part 18A and the offset part 18D.

Figure 5:
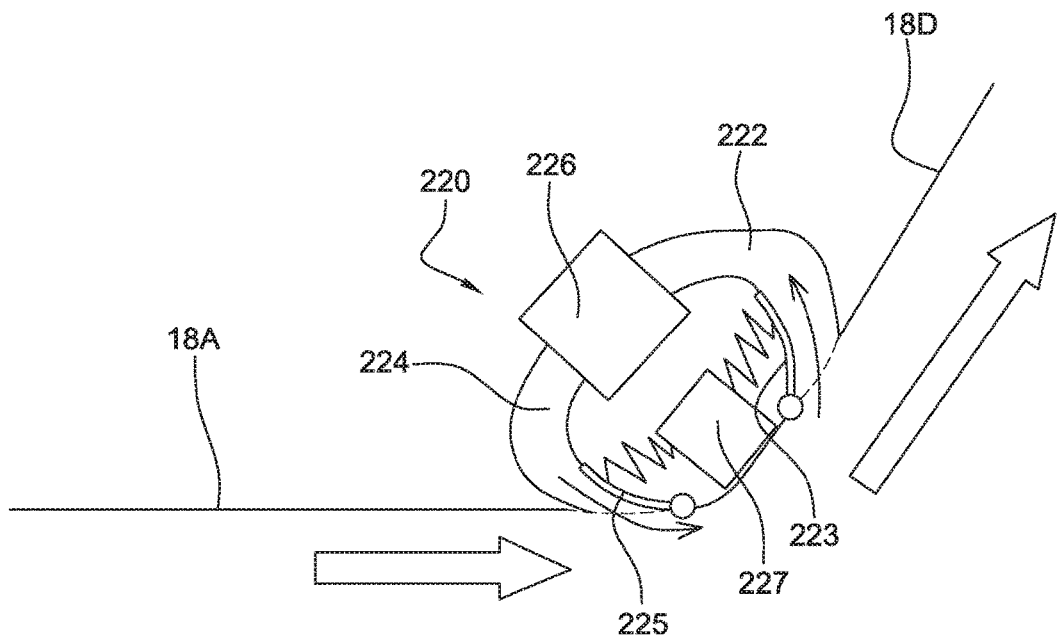
FIG. 5 is a diagram showing a third embodiment of the invention.

FIG. 5 shows an embodiment 220 having a compressor 226 and a system 227 for controlling valves 223 and 225 which control the air intake 222 and the blowing 224, respectively.

The valves preferably open during the take-off phase of the aircraft, when the turbulence in the flow duct is greatest.

Figure 6:
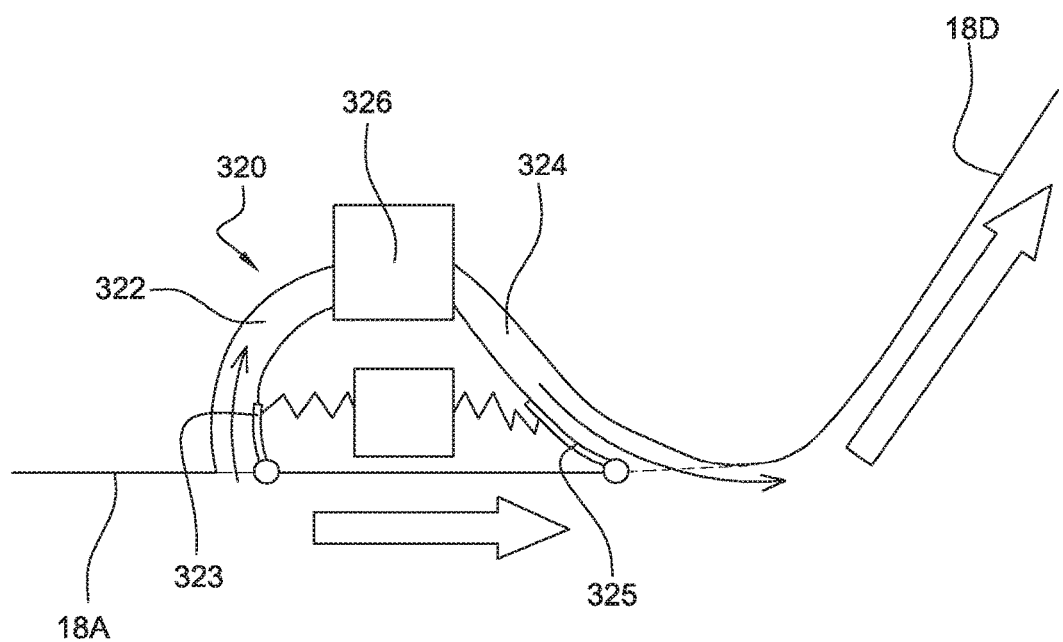
FIG. 6 is a diagram showing a fourth embodiment of the invention.

FIG. 6 shows a variant 320 in which the air intake 322 is positioned upstream of the air injection region 324, preferably close thereto. The air is injected through openings which are positioned directly upstream of the region in which the boundary layer is capable of being shed, for example before the curvature between the axial part 18A and the offset part 18D. Here again, a compressor 326 makes it possible to increase the pressure between the air intake and the blowing. A system 327 controls the valves 323 and 325 as in the previous solution.

The solution of the invention has been described for the air inlet duct 18 having the structure in FIG. 1. This solution also applies to the air inlet duct 16.

While illustrative embodiments have been illustrated and described, it will be appreciated that various changes can be made therein without departing from the spirit and scope of the invention.

The embodiments of the invention in which an exclusive property or privilege is claimed are defined as follows:

1. An air inlet duct of a turbine engine, said air inlet duct extending axially between an air inlet and a gas generator of said turbine engine, said air inlet duct having a wall comprising a first axial wall part and a second wall part which is angularly offset with respect to the first axial wall part, said air inlet duct being capable of causing, in a shedding region, shedding of a boundary layer formed by an air flow along the wall of the duct; and a control device for controlling said shedding of the boundary layer, wherein said control device comprises an air-blowing pipe which opens via at least one air-injection opening which is directly upstream of the shedding region, said air-blowing pipe being connected to an air intake positioned upstream of said at least one air-injection opening or in the shedding region and comprising an air compressor means between said air intake and said at least one air-injection opening.

2. The air inlet duct according to claim 1, wherein said at least one air-injection opening is positioned directly upstream of said second wall part.

3. The air inlet duct according to claim 1, wherein said air intake is positioned on the first axial wall part of the air inlet duct where the boundary layer is bonded to said wall.

4. The air inlet duct according to claim 1, wherein said wall forms a lip at an upstream aperture thereof, said lip accommodating a groove, and said air intake being arranged in said groove.

5. The air inlet duct according to claim 1, wherein said air intake is positioned downstream of said at least one air-injection opening, along said second wall part, in said shedding region.

6. The air inlet duct according to claim 1, wherein at least one of said air intake and said at least one air-injection opening is provided with a shut-off valve.

7. The air inlet duct according to claim 1, wherein said air intake and said at least one air-injection opening are each provided with a valve, said valves being controlled by a common control system.

8. An aircraft turbine engine having unducted propellers, which comprises the air inlet duct according to claim 1.

9. The aircraft turbine engine according to claim 8, the air inlet duct of which comprises an axial part and an intermediate part, the intermediate part dividing the axial part into two duct portions: a first duct portion which is angularly offset with respect to said axial part, and a second duct portion that is an axial extension of said axial part.

\* \* \* \* \*